United States Patent
Kondo et al.

(10) Patent No.: US 8,098,555 B2
(45) Date of Patent: Jan. 17, 2012

(54) OPTICAL DISK DEVICE WITH COMA ABERRATION CORRECTION

(75) Inventors: Kenji Kondo, Osaka (JP); Shinichi Yamada, Osaka (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 1101 days.

(21) Appl. No.: 11/572,429

(22) PCT Filed: Jul. 21, 2005

(86) PCT No.: PCT/JP2005/013425
§ 371 (c)(1),
(2), (4) Date: Apr. 23, 2007

(87) PCT Pub. No.: WO2006/009227
PCT Pub. Date: Jan. 26, 2006

(65) Prior Publication Data
US 2009/0122663 A1 May 14, 2009

(30) Foreign Application Priority Data

Jul. 23, 2004 (JP) .................... 2004-216468

(51) Int. Cl.
*G11B 7/00* (2006.01)
(52) U.S. Cl. ............ 369/53.19; 369/44.32; 369/47.39; 369/47.45
(58) Field of Classification Search .... 369/44.32–44.33, 369/47.14, 47.36, 47.38–47.41, 47.43–47.45, 369/53.13–53.19, 53.37, 94
See application file for complete search history.

(56) References Cited

U.S. PATENT DOCUMENTS

| | | | | |
|---|---|---|---|---|
| 6,314,067 | B1 * | 11/2001 | Chung et al. | 369/44.32 |
| 2002/0097504 | A1 | 7/2002 | Kitamura et al. | |
| 2002/0131347 | A1 * | 9/2002 | Raaymakers | 369/44.32 |
| 2002/0181367 | A1 * | 12/2002 | Ogasawara | 369/53.19 |

(Continued)

FOREIGN PATENT DOCUMENTS

JP 10-83537 3/1998

(Continued)

OTHER PUBLICATIONS

Machine-Assisted Translation of JP 2001-256712.*

(Continued)

*Primary Examiner* — Nathan Danielsen
(74) *Attorney, Agent, or Firm* — Renner, Otto, Boisselle & Sklar, LLP

(57) ABSTRACT

The optical disc apparatus according to the present invention includes a tilt detecting means; a coma aberration correcting means; and a spherical aberration correcting means. Based on the result of a tilt detection, the amount of the correction performed by the coma aberration correcting means is determined so that the amount of correction is constant for the whole circumference of an optical disc, and then a spherical aberration is corrected by the spherical aberration correcting means. Thus, it is possible to correct the spherical aberration that has occurred due to the coma aberration correcting means, while the tilt margin is secured, thereby improving the reliability of reproduction and recording by the optical disc apparatus. Further, the optical disc apparatus according to the present invention is configured, in the case where a thermal shock tilt has occurred during the activation of the apparatus, to wait until the thermal shock tilt has settled. Thus, it is possible to perform the activation while the influence of the thermal shock tilt is avoided, thereby improving the reliability of the recording and reproduction operations by the optical disc apparatus.

9 Claims, 10 Drawing Sheets

U.S. PATENT DOCUMENTS

| | | |
|---|---|---|
| 2003/0147314 A1 | 8/2003 | Kondo et al. |
| 2005/0078574 A1 | 4/2005 | Wada et al. |

FOREIGN PATENT DOCUMENTS

| | | |
|---|---|---|
| JP | 10-83549 | 3/1998 |
| JP | 10-162395 | 6/1998 |
| JP | 2001-043605 | 2/2001 |
| JP | 2001-256712 | 9/2001 |
| JP | 2002-140831 | 5/2002 |
| JP | 2003-281761 | 10/2003 |
| JP | 2004-171615 | 6/2004 |
| WO | 03/075266 | 9/2003 |
| WO | 03/083850 A2 | 10/2003 |

OTHER PUBLICATIONS

International Search Report for corresponding Application No. PCT/JP2005/013425 mailed Oct. 25, 2005.

Japanese Office Action for corresponding application No. JP 2006-529284 dated Feb. 26, 2009.

* cited by examiner

Fig. 8
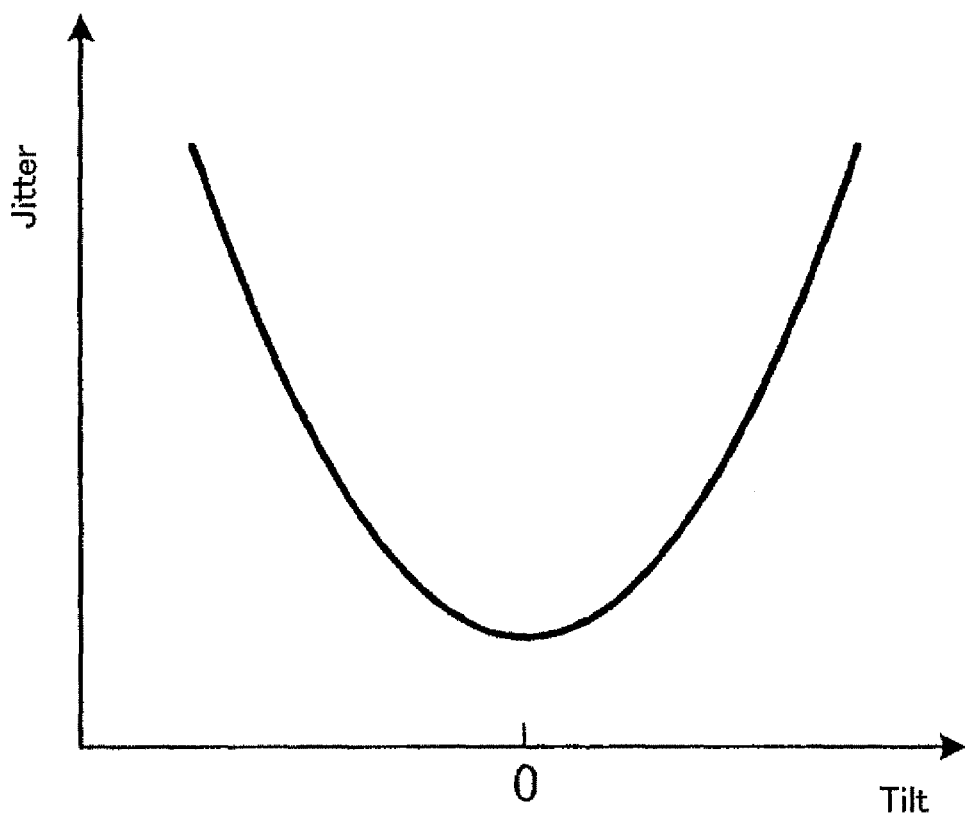
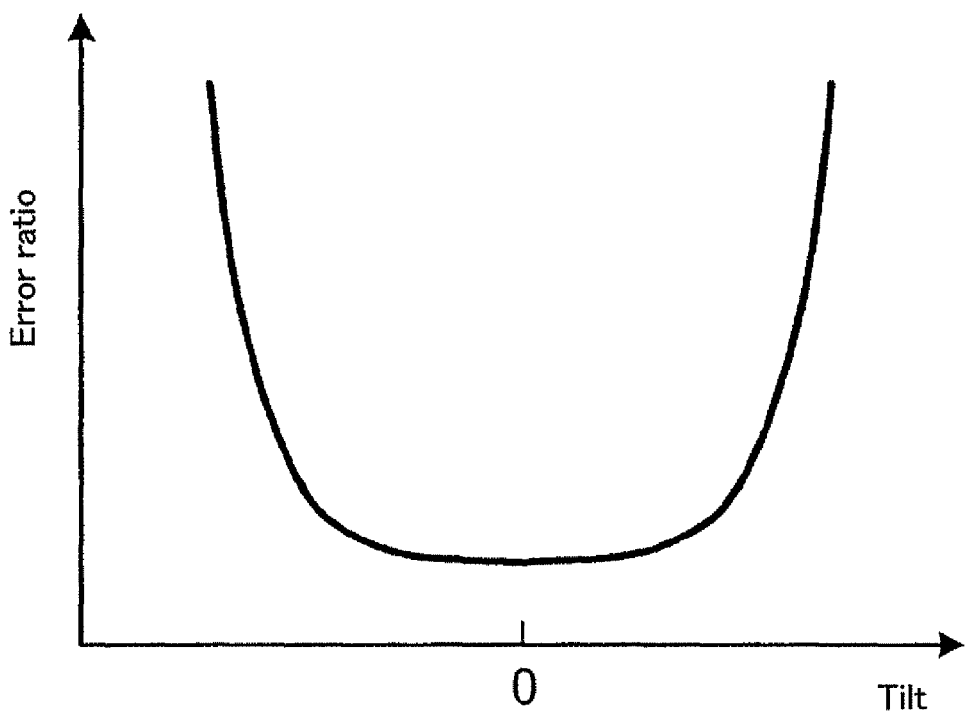

OPTICAL DISK DEVICE WITH COMA ABERRATION CORRECTION

TECHNICAL FIELD

The present invention relates to an optical disc apparatus for reproducing signals on an optical disc (which may be any one of various types of optical discs including reproduction-only discs and recording/reproduction discs) using a light source such as a laser, and particularly relates to an optical disc apparatus including a coma aberration correcting means for correcting a coma aberration of a light beam in the radial direction on an optical disc.

BACKGROUND ART

In an optical disc apparatus, an angle by which the data surface of an optical disc is out of alignment with a direction perpendicular to the optical axis of a light beam irradiated onto the optical disc is called a tilt angle. When the tilt angle is not zero, we say that a tilt has occurred. As optical discs have been developed to have high density, degradation of jitters in a recording signal or a reproduction signal becomes significant due to tilts occurring with optical discs and optical disc apparatuses, and it is getting difficult to maintain a sufficient level of performance.

FIG. 7 is a schematic diagram showing how the distribution of the strength of a light beam projected on the data surface of an optical disc changes due to occurrence of a tilt. FIG. 8 are characteristic charts showing a tilt to occur in relation to the jitter in reproduction signals and the error ratio. As can be appreciated from FIG. 7 and FIG. 8, a coma aberration occurs due to a tilt, and as a result, the jitter in the reproduction signals is degraded and also the error ratio increases.

When an aberration that occurs due to a tilt exceeds a tolerance value, problems arise where it becomes impossible to perform recording or reproduction under an optimal condition, and also the reliability of the data is lowered. In addition, the higher the recording density of an optical disc is, the smaller the tolerance range for the aberration caused by tilts becomes. Thus, it becomes difficult to secure a recording/reproduction performance of the apparatus.

In order to secure a recording/reproduction performance for a high-density optical disc, in a conventional disc apparatus, not only is the mechanical positioning of the optical systems and the driving systems adjusted, but also a tilt is detected during the operation of the apparatus and a tilt control is introduced in order to tilt an objective lens based on the detected result. As a result, a coma aberration is corrected and an optimal recording and reproduction of the apparatus is realized (see, for example, Reference 1).

Hereinafter, a structure of a conventional optical disc apparatus will be described.

FIG. 9 is a block diagram showing a structure of a conventional optical disc apparatus.

In FIG. 9, an optical head 100 includes a light source 101, a collimator lens 102, a polarized beam splitter 103, a quarter wavelength plate 104, an objective lens 105, a converging lens 107, a detector 108 and a focus actuator 113.

The light source 101 emits a light beam toward the data surface of an optical disc 106. The light source 101 is, for example, a semiconductor laser device.

The collimator lens 102 converts the light beam (diverging light) emitted from the light source 101 into a collimated light.

The polarized beam splitter 103 is an optical device for totally reflecting a linearly polarized light of the light beam emitted from the light source 101 and totally transmitting a linearly polarized beam which is present in the direction orthogonal to the linearly polarized beam of the light beam emitted from the light source 101.

The quarter wavelength plate 104 is an optical device for converting a polarized light of a transmitted light from a circular polarized light to a linearly polarized light or from a linearly polarized light to a circular polarized light.

The objective lens 105 converges a light beam onto the data surface of the optical disc 106.

The converging lens 107 converges the light beam that has passed through the polarized beam splitter 103 on the detector 108.

The detector 108 is a device converting a received light into an electric signal and includes a plurality of areas.

A preamplifier 109 is an electric device that converts a current output from each of the areas of the detector 108 into a voltage.

An FE signal generating unit 110 is an electric circuit generating, from a plurality of output signals from the preamplifier 109, a focus error signal (FE signal) that corresponds to a convergence state of a light beam on the data surface of the optical disc 106. A focus controlling unit 111 is a circuit outputting a focus controlling signal based on an output signal from the FE signal generating unit 110. A focus driving unit 112 is a circuit for outputting a focus actuator driving signal based on the focus controlling signal. The focus actuator 113 is an element moving the objective lens 105 in a direction perpendicular to the data surface of the optical disc 106 (hereinafter, this direction will be referred to as "the focus direction"). A tilt sensor 900 includes a light source 901 and a detector 902.

The light source 901 emits a light beam toward the data surface of the optical disc 106. The light source 901 is, for example, a light emitting diode.

The detector 902 is a device for receiving the light beam which has been emitted from the light source 901 and then reflected by the data surface of the optical disc 106 and converting the received light beam into an electric signal. The detector 902 includes a plurality of areas.

The tilt signal generating unit 903 is an electric circuit for generating a tilt signal that corresponds to a tilt of the optical axis with respect to the data surface of the optical disc 106, based on an output signal from the detector 902.

A tilt controlling unit 904 is a circuit for outputting a tilt controlling signal based on the tilt signal.

A tilt driving unit 905 is a circuit for outputting a tilt actuator driving signal based on the signal output from the tilt controlling unit 904.

A tilt actuator 906 is an element for tilting the optical axis of the light beam to be irradiated onto the optical disc 106 by tilting the optical head 100.

A focus controlling operation and a tilt controlling operation of the conventional optical disc structured described above will be described with reference to FIG. 9.

The linearly polarized light of the light beam emitted from the light source 101 is incident on the collimator lens 102 and converted into a collimated light by the collimator lens 102. The light beam collimated by the collimator lens 102 is incident on the polarized beam splitter 103. The light beam reflected by the polarized beam splitter 103 is converted into a circular polarized beam by the quarter wavelength plate 104. The light beam that has been converted into the circular polarized beam by the quarter wavelength plate 104 is incident on the objective lens 105 and is then converged onto the optical disc 106. The light beam is reflected by the optical disc 106, passes through the polarized beam splitter 103 and then is incident on the converging lens 107. The light beam that has been incident on the converging lens 107 is then incident on the detector 908. The light beam that has been incident on the detector 908 is converted into an electric signal in each of the areas of the detector 908. The electric signal converted in each of the areas of the optical detector 908 is then converted into a voltage by the preamplifier 909. A plurality of output signals from the preamplifier 909 are computed by the FE generating unit 110, so that an FE signal is output. The FE signal, which is the output signal from the FE generating unit 110, is input to the focus controlling unit 111 and passes through a phase compensating circuit and a low range compensating circuit that includes a digital filter using, for example, a digital signal processor (hereinafter, referred to as a "DSP"), so as to become a focus driving signal. The focus driving signal output from the focus controlling unit 111 is input to the focus driving unit 112, is amplified and is then output to the focus actuator 113. As a result of the operation described above, a focus control is realized where the convergence state of the light beam on the data surface of the optical disc 106 is controlled to be a predetermined convergence state at all times.

Next, a tilt controlling operation will be described.

The light beam emitted from the light source 901 toward the optical disc 106 is reflected by the optical disc 106 and is incident on the detector 902. The light beam incident on the detector 902 is converted into an electric signal in each of the areas of the detector 902. A plurality of output signals from the detector 902 are computed by the tilt signal generating unit 903 so that a tilt signal is output. The tilt signal, which is the output signal from the tilt signal generating unit 903, is input to the tilt controlling unit 904 and passes through a phase compensating circuit and a low range compensating circuit that includes a digital filter using a DSP, like in the focus controlling system, so as to become a tilt driving signal. The tilt driving signal output from the tilt controlling unit 904 is input to the tilt driving unit 905, is amplified and is then output to the tilt actuator 906. As a result of the operation described above, a tilt control is realized where the light beam is irradiated onto the data surface of the optical disc 106, as being orthogonal to the data surface at all times.

Reference 1: Japanese Laid-Open Publication No. 02-122432.

DISCLOSURE OF THE INVENTION

The conventional tilt control has the following problem.

When a tilt detection is performed using the tilt sensor 900, it is difficult to match the detection position of the tilt sensor 900 with the position of the light beam irradiated onto the data surface of the optical disc 106, on account of the spatial arrangement. The reason is because the optical head (especially the objective lens 105) is always positioned perpendicularly beneath the irradiation position of the light beam on the data surface. Accordingly, the tilt sensor 900 detects a tilt of the optical disc 106 at a position a little away from the position of the light beam. Consequently, when the data surface of the optical disc 106 has a curved shape, the tilt sensor 900 is not able to detect the tilt at the light beam position accurately. Thus, the problem arises where it is not possible to conduct accurate tilt control.

In addition, there is a difference (a zero point offset) between the tilt detected by the tilt sensor 900 and an actual tilt, due to characteristic variations among individual tilt sensors 900 and a positioning error among the tilt sensor 900, the optical head 100, and a driving mechanism that rotates the optical disc 106, the positioning error being caused at the time when the apparatus is assembled. In order to make the zero point offset equal to or smaller than a predetermined value, a precise adjustment is required for each of optical disc apparatuses in the assembly step of the apparatuses. As a result, the problem arises where the manufacturing costs of the optical disc apparatuses increase.

Further, even if the zero point offset is adjusted in the assembly step of the apparatuses, an error may still occur due to changes in the tilt sensor 900 over the course of time and the temperature characteristics. Such an error that occurs after the assembly step raises another problem whereby the tilt sensor 900 is not able to conduct accurate tilt control.

Information equipment marketed in recent years is often strongly demanded to have a small external form. In the conventional optical disc apparatus described above, however, it is difficult to make the optical head compact because a space for installing the tilt sensor is required. In addition, because the tilt actuator 906 is configured to tilt the optical head 100, it is difficult to make the optical disc apparatus compact. Furthermore, the tilt sensor itself can be one of the causes that increase the costs of the optical disc apparatus.

The present invention is intended to solve at least one of the problems described above and the objective of the present invention is to provide an optical disc apparatus including a tilt detecting unit using a focus driving signal and a tilt correcting means for performing a tilt correction by tilting the lens 105.

With the use of the tilt detecting means and the tilt correcting means included in the optical disc apparatus according to the present invention, it is possible to conduct proper tilt control, thereby improving the reliability of recording/reproduction operation of the optical disc apparatus.

Further, with the use of the tilt detecting means and the tilt correcting means included in the optical disc apparatus according to the present invention, it is possible to make the optical disc apparatus compact and to reduce the manufacturing costs of the optical disc apparatus.

An optical disc apparatus according to the present invention includes: an optical head for irradiating a light beam onto an optical disc; an optical head moving means for moving the optical head in a radial direction of the optical disc; a coma aberration correcting means for correcting a coma aberration of the light beam in the radial direction on the optical disc; and a tilt detecting means for detecting a tilt of the optical disc in the radial direction, wherein an amount of the correction performed by the coma aberration correcting means is a predetermined value regardless of a position of the optical head, and the optical head is moved by the optical head moving means in a predetermined moving range, and the predetermined value is determined based on a mean value of a largest value and a smallest value of the tilt detected by the tilt detecting means within the predetermined moving range.

The predetermined moving range may be a range between a substantially innermost circumference position on the optical disc and a substantially outermost circumference position on the optical disc, and the predetermined value may be determined based on the mean value of the tilt detected by the tilt detection means at the substantially innermost circumference position on the optical disc and the tilt detected by the tilt detection means at the substantially outermost circumference position on the optical disc.

The optical disc may include a plurality of data layers, and the amount of the correction performed by the coma aberration correcting means may be a predetermined value for each of the data layers, regardless of the position of the optical head.

The optical disc apparatus according to the present invention may have an arrangement to further include an aberration correcting means for correcting an aberration, other than the coma aberration, of the light beam in the radial direction on the optical disc, wherein after the coma aberration is corrected by the coma aberration means, the aberration other than the coma aberration is corrected by the aberration correcting means.

The aberration correcting means may include a spherical aberration correcting means for correcting a spherical aberration.

The optical disc apparatus according to the present invention may have an arrangement wherein when the optical disc apparatus is activated, in a case where the tilt of the optical disc detected by the tilt detecting means exceeds a predetermined angle, the activation of the optical disc apparatus is started all over again.

The activation of the optical disc apparatus may be started all over again based on the tilt of the optical disc detected by the tilt detecting means at an outer circumference position on the optical disc.

The optical disc apparatus according to the present invention may have an arrangement to further include a correction amount determining means for determining the amount of the correction performed by the coma aberration correcting means based on the tilt of the optical disc detected by the tilt detecting means, wherein during the activation of the optical disc apparatus, in a case where the amount of the correction determined by the correction amount determining means exceeds a predetermined value, the activation of the optical disc apparatus is started all over again.

The optical disc apparatus according to the present invention may have an arrangement wherein during an activation of the optical disc apparatus that has been started all over again, in a case where the tilt of the optical disc detected by the tilt detecting means exceeds a predetermined angle once again, a recording operation of the optical disc apparatus is prohibited.

The optical disc apparatus according to the present invention may have an arrangement wherein during the activation of the optical disc apparatus that has been started all over again, in a case where the amount of the correction determined by the correction amount determining means exceeds a predetermined value once again, the recording operation of the optical disc apparatus is prohibited.

An optical disc apparatus according to the present invention includes: an optical head for irradiating a light beam onto an optical disc; an optical head moving means for moving the optical head in a radial direction of the optical disc; a coma aberration correcting means for correcting a coma aberration of the light beam in the radial direction on the optical disc; and a tilt detecting means for detecting a tilt of the optical disc in the radial direction, wherein an amount of the correction performed by the coma aberration correcting means is a predetermined value regardless of a position of the optical head. With this arrangement, the amount of the correction performed by the coma aberration correcting means does not change in accordance with a change in the position of the optical head. As a result, it is possible to shorten the access period of the optical head and to improve the performance of the optical disc apparatus.

Further, the optical head is moved by the optical head moving means in a predetermined moving range, and the predetermined value is determined based on a mean value of a largest value and a smallest value of the tilt detected by the tilt detecting means within the predetermined moving range. With this arrangement, the tilt margin for the optical disc apparatus becomes the largest, and it is possible to achieve a light spot that is always optically good for the whole circumference of the optical disc. As a result, it is possible to improve the reliability of the recording and reproduction operations by the optical disc apparatus.

The predetermined moving range may be a range between a substantially innermost circumference position on the optical disc and a substantially outermost circumference position on the optical disc. In such a case, the predetermined value is determined based on the mean value of the tilt detected by the tilt detection means at the substantially innermost circumference position on the optical disc and the tilt detected by the tilt detection means at the substantially outermost circumference position on the optical disc. With this arrangement, it is possible to shorten the tilt detection period and also to shorten the activation period of the optical disc apparatus. As a result, it is possible to improve the performance of the optical disc apparatus.

The optical disc may include a plurality of data layers. In such a case, the amount of the correction performed by the coma aberration correcting means is a predetermined value for each of the data layers, regardless of the position of the optical head.

The optical disc apparatus according to the present invention has an arrangement to further include an aberration correcting means for correcting an aberration, other than the coma aberration, of the light beam in the radial direction on the optical disc, wherein after the coma aberration is corrected by the coma aberration means, the aberration other than the coma aberration is corrected by the aberration correcting means. With this arrangement, the tilt margin for the optical disc apparatus becomes large, and also, it is possible to correct aberrations other than the coma aberration that are caused by the coma aberration correction. Consequently, it is possible to improve the reliability of the recording and reproduction operation by the optical disc apparatus.

The optical disc apparatus according to the present invention has an arrangement wherein the aberration correcting means includes a spherical aberration correcting means for correcting a spherical aberration. With this arrangement, the tilt margin for the optical disc apparatus becomes large, and also, it is possible to correct a spherical aberration that is caused by the coma aberration correction. Consequently, it is possible to improve the reliability of the recording and reproduction operations by the optical disc apparatus.

The optical disc apparatus according to the present invention has an arrangement wherein during an activation of the optical disc apparatus, in a case where the tilt of the optical disc detected by the tilt detecting means exceeds a predetermined angle, the activation of the optical disc apparatus is started all over again. With this arrangement, it is possible to activate the optical disc apparatus while the influence of a thermal shock tilt is avoided. Consequently, it is possible to improve the reliability of the recording and reproduction operations by the optical disc apparatus.

The optical disc apparatus according to the present invention has an arrangement wherein the activation of the optical disc apparatus is started all over again based on the tilt of the optical disc detected by the tilt detecting means at an outer circumference position on the optical disc. With this arrangement, it is possible to activate the optical disc apparatus while the influence of a thermal shock tilt is avoided. Consequently, it is possible to improve the reliability of the recording and reproduction operations by the optical disc apparatus.

The optical disc apparatus according to the present invention has an arrangement to further include: a correction amount determining means for determining the amount of the correction performed by the coma aberration correcting means based on the tilt of the optical disc detected by the tilt detecting means, wherein during the activation of the optical disc apparatus, in a case where the amount of the correction determined by the correction amount determining means exceeds a predetermined value, the activation of the optical disc apparatus is started all over again. With this arrangement, it is possible to activate the optical disc apparatus while the influence of a thermal shock tilt is avoided. Consequently, it is possible to improve the reliability of recording and reproduction operations by the optical disc apparatus.

The optical disc apparatus according to the present invention has an arrangement wherein during an activation of the optical disc apparatus that has been started all over again, in a case where the tilt of the optical disc detected by the tilt detecting means exceeds a predetermined angle once again, a recording operation of the optical disc apparatus is prohibited. With this arrangement, it is possible to prevent excessive light emission from the light source. Consequently, it is possible to improve the performance of the optical disc apparatus.

The optical disc apparatus according to the present invention has an arrangement wherein during the activation of the optical disc apparatus that has been started all over again, in a case where the amount of the correction determined by the correction amount determining means exceeds a predetermined value once again, the recording operation of the optical disc apparatus is prohibited. With this arrangement, it is possible to prevent excessive light emission from the light source. Consequently, it is possible to improve the performance of the optical disc apparatus.

BRIEF DESCRIPTION OF THE DRAWINGS

FIG. 8 are characteristic chart showing, in order to explain a conventional technique, a tilt amount of an optical disc when a tilt occurs in relation to the jitter in reproduction signals and the error ratio.

| | |
|---|---|
| 100 | optical head |
| 101 | light source |
| 102 | collimator lens |
| 103 | polarized beam splitter |
| 104 | quarter wavelength plate |
| 105 | objective lens |
| 106 | optical disc |
| 107 | converging lens |
| 108 | detector |
| 109 | preamplifier |
| 110 | focus error (FE) signal generating unit |
| 111 | focus controlling unit |
| 112 | focus driving unit |
| 113 | focus actuator |
| 114 | adder |
| 115 | subtracter |
| 116 | microcomputer |
| 117 | memory |
| 118 | collimator lens moving motor driving unit |
| 119 | collimator lens moving motor |
| 120 | moving motor driving unit |
| 121 | moving motor |
| 900 | tilt sensor |
| 901 | light source |
| 902 | detector |
| 903 | tilt signal generating unit |
| 904 | tilt controlling unit |
| 905 | tilt driving unit |
| 906 | tilt actuator |

BEST MODE FOR CARRYING OUT THE INVENTION

Hereinafter, embodiment of the present invention will be described with reference to the accompanying drawings.

First Embodiment

Figure 1:
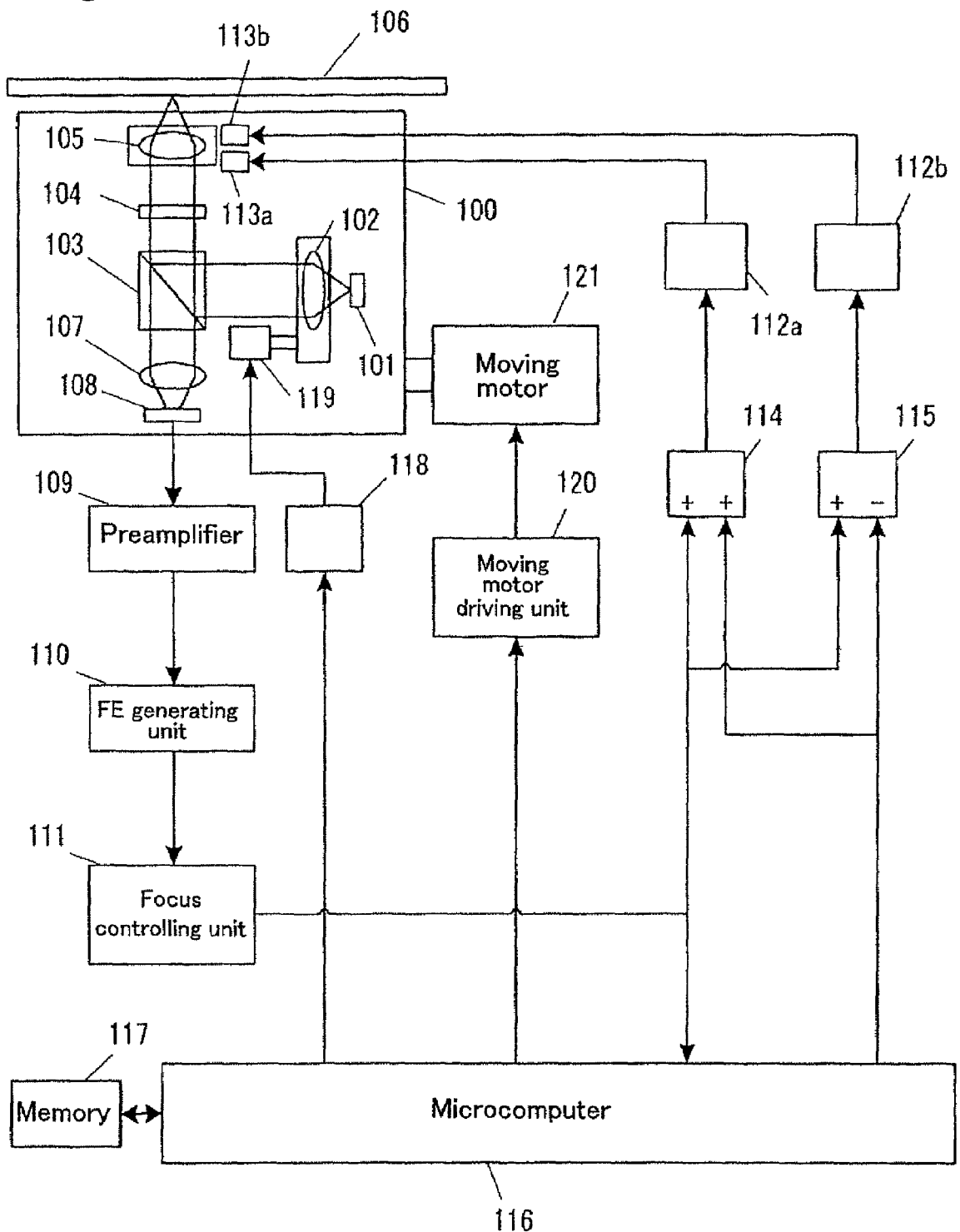
FIG. 1 is a block diagram showing an optical disc apparatus according to First Embodiment of the present invention.

FIG. 1 is a block diagram showing a structure of an optical disc apparatus according to First Embodiment of the present invention. It should be noted that the constituent elements that are also included in the conventional optical disc apparatus are referred to by the same reference numbers, and thus the description thereof will be omitted.

In FIG. 1, an adder 114 is an electric circuit for performing an addition on a focus driving signal and an output from a microcomputer 116. A subtracter 115 is an electric circuit for performing a subtraction on a focus driving signal and an output from the microcomputer 116. A first focus driving unit 112a is a circuit for outputting a focus actuator driving signal based on an output signal from the adder 114. A second focus driving unit 112b is a circuit for outputting a focus actuator driving signal based on an output signal from the subtracter 115. A first focus actuator 113a and a second focus actuator 113b are mounted having the objective lens 105 interposed therebetween so as to be symmetrical to each other in the radial direction of the optical disc 106. The first focus actuator is an element for moving the outer circumference side of the objective lens 105 in the focus direction. The second focus actuator is an element for moving the inner circumference side of the objective lens 105 in the focus direction. The memory 117 is a storage circuit for storing data therein. A collimator lens moving motor driving unit 118 is a circuit for amplifying a collimator lens moving motor driving signal output from the microcomputer 116 and outputting the amplified signal. A collimator lens moving motor 119 is an element for moving the collimator lens 102 in a direction parallel to the direction of the light beam. A moving motor driving unit 120 is a circuit for amplifying a moving motor driving signal output from the microcomputer 116 and outputting the amplified signal. A moving motor 121 is an element for moving the optical head 100 in the radial direction of the optical disc 106.

As described above, the optical head 100 includes the light source 101, the collimator lens 102, the polarized beam splitter 103, the quarter wavelength plate 104, the objective lens 105, the converging lens 107, the detector 108, the focus actuators 113a and 113b and the collimator lens moving motor 119. An optical head moving means includes the microcomputer 116, the moving motor driving unit 120 and the moving motor 121. A coma aberration correcting means includes the microcomputer 116, the adder 114, the subtracter 115, the focus driving units 112a and 112b, the focus actuators 113a and 113b and the objective lens 105. A tilt detecting means includes the optical head 100, the preamplifier 109, the FE generating unit 110, the focus controlling unit 111, the microcomputer 116, the memory 117, the adder 114, the subtracter 115, the focus driving units 112a and 112b and the optical head moving means. An aberration correction means includes the microcomputer 116, the collimator lens moving motor driving unit 118, the collimator lens moving motor 119 and the collimator lens 102.

A focus control operation of the optical disc apparatus configured as described above will be described.

As described in the operation of the conventional optical disc apparatus, a light beam emitted from the light source 101 goes through the collimator lens 102, the polarized beam splitter 103 and the quarter wavelength plate 104, is incident on the objective lens 105 and is then converged onto the optical disc 106. The light beam reflected by the optical disc 106 goes through the polarized beam splitter 103 and the converging lens 107 and is incident on the detector 108. The light beam incident on the detector 108 is converted to an electric signal in each of the areas of the detector 108. The electric signal converted in the areas of the detector 108 is converted into a voltage by the amplifier 109. A plurality of output signals from the preamplifier 109 are computed by the FE generating unit 110 so that an FE signal is outputted. The FE signal, which is the output signal from the FE generating unit 110, is input to the focus controlling unit 111, passes through the phase compensating circuit and the low range compensating circuit and becomes a focus driving signal.

The focus driving signal output from the focus controlling unit 111 and an output signal from the microcomputer 116 are added together by the adder 114. An output signal from the adder 114 is input to the first focus driving unit 112a, is amplified and is then output to the first focus actuator 113a. A focus driving signal output from the focus controlling unit 111 is input to a positive terminal of the subtracter 115. An output signal from the microcomputer 116 is input to a negative terminal of the subtracter 115. A result of a subtraction is outputted from the subtracter 115. The output signal from the subtracter 115 is input to the second focus driving unit 112b, is amplified and is then output to the second focus actuator 113b.

Owing to the operation described above, it is possible to realize focus control where the convergence state of the light beam on the data surface of the optical disc 106 is controlled to be a predetermined convergence state at all times.

Next, the principle of a tilt detection using a focus driving signal according to the present invention will be described with reference to FIG. 2.

A tilt of the light beam axis with respect to the data surface of an optical disc can be divided into a component in the radial direction of the optical disc and a component in the circumferential direction of the optical disc. Normally, a reproduction signal processing circuit is configured so that the influence of the tilt from the circumferential direction component is eliminated by a signal processing. The present invention addresses a tilt in the radial direction of the optical disc. Hereinafter, a tilt in the direction of the radius (a tilt in the radial direction) of the optical disc will be simply referred to as a tilt.

Figure 2:
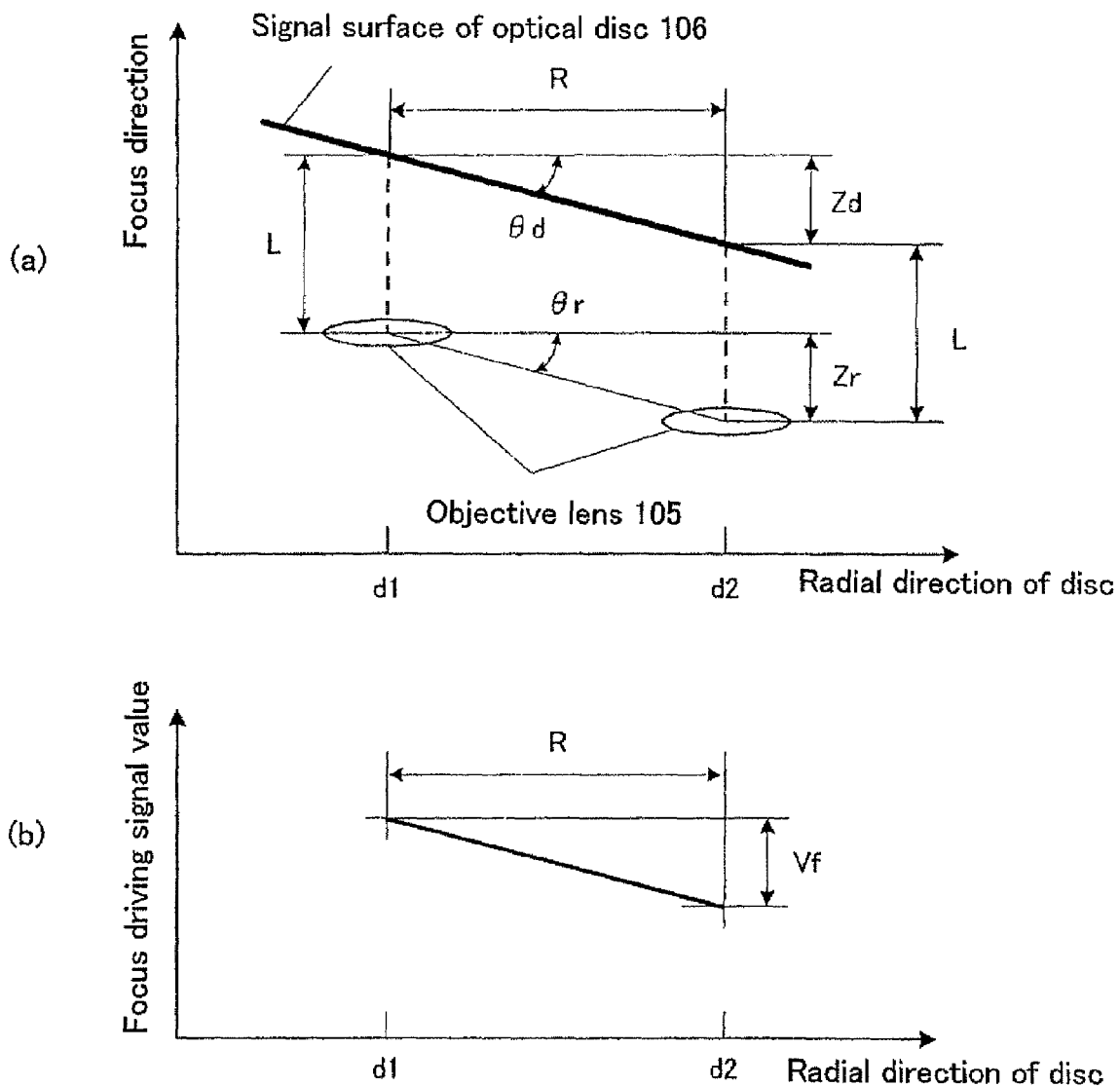
FIG. 2 is a schematic chart showing the relative positions of the data surface, which has a tilt, of the optical disc 106 and the objective lens 105 and the relationship between the position of the optical head and a focus driving signal according to First Embodiment of the present invention.

Portion (a) of FIG. 2 is a schematic chart showing the relative positions of the objective lens 105 and the data surface of the optical disc 106 when the optical disc 106 has a tilt. Portion (b) of FIG. 2 is a schematic chart showing the relationship between the position of the optical head with respect to the radial direction of the optical head (hereinafter, referred to as the "radius position") and a focus driving signal value at the radius position.

As described above, in the optical disc apparatus, the focus control operation is performed by driving the focus actuators so that the light beam is in the predetermined convergence state on the data surface of the optical disc 106 at all times. Accordingly, while the focus control operation is performed, the distance between the data surface of the optical disc 106 and the objective lens 105 is a predetermined length (L), regardless of the radius position. In the case where the optical disc 106 is tilted, because the position of the objective lens 105 changes in correspondence, the difference between the position of the objective lens 105 at the radius position d1 and the position of the objective lens 105 at the radius position d2 is Zr.

The value Zr is equal to the difference Zd between the height of the data surface for the radius position d1 and the height of the data surface for the radius position d2 of the optical disc 106. Because the inclination θd with respect to the horizontal plane of the disc is equal to the angle θr between a line for connecting the positions of the objective lens 105 at the radius positions d1 and d2 and the horizontal plane, it is possible to obtain the inclination (i.e. the tilt) of the data surface of the optical disc 106 using Equation (1) shown below, based on the value Zr and the difference R between the radius positions d1 and d2:

$$\theta d = \theta r = \tan^{-1}(Zr/R) \quad (1)$$

Also, because the relationship between the focus driving signal value, which is a driving input for controlling the focus actuators 113a and 113b, and the change in the position of the objective lens 105 can be recognized in advance, it is possible to obtain the position of the objective lens 105 in the focus direction, based on the focus driving signal value. When the relationship between the focus driving signal value and the amount of the change in the position of the objective lens 105 in the focus direction 105 is denoted as Kf, and the difference between the focus driving signal values for radius positions d1 and d2 is denoted as Vf, θd can be expressed using Equation (2) shown below, based on Equation (1):

$$\theta d = \tan^{-1}(Kf \times Vf/R) \quad (2)$$

In this situation, because a tilt that occurs with the optical disc 106 such as a CD or a DVD is about 1 degree, θd can be approximated as shown in Equation (3) below, which hardly causes any error:

$$\theta d \approx Kf \times Vf/R \quad (3)$$

As shown above, the change in the focus driving signal value with respect to the radius positions is approximately equal to the change in the amount of the warp of the data surface with respect to the radial direction. Accordingly, based on this relationship, it is possible to detect the tilt by detecting the focus driving signal value for each of the predetermined radius positions.

Next, the coma aberration correction operation using the objective lens 105 according to the present embodiment will be described with reference to FIG. 3.

Figure 3:
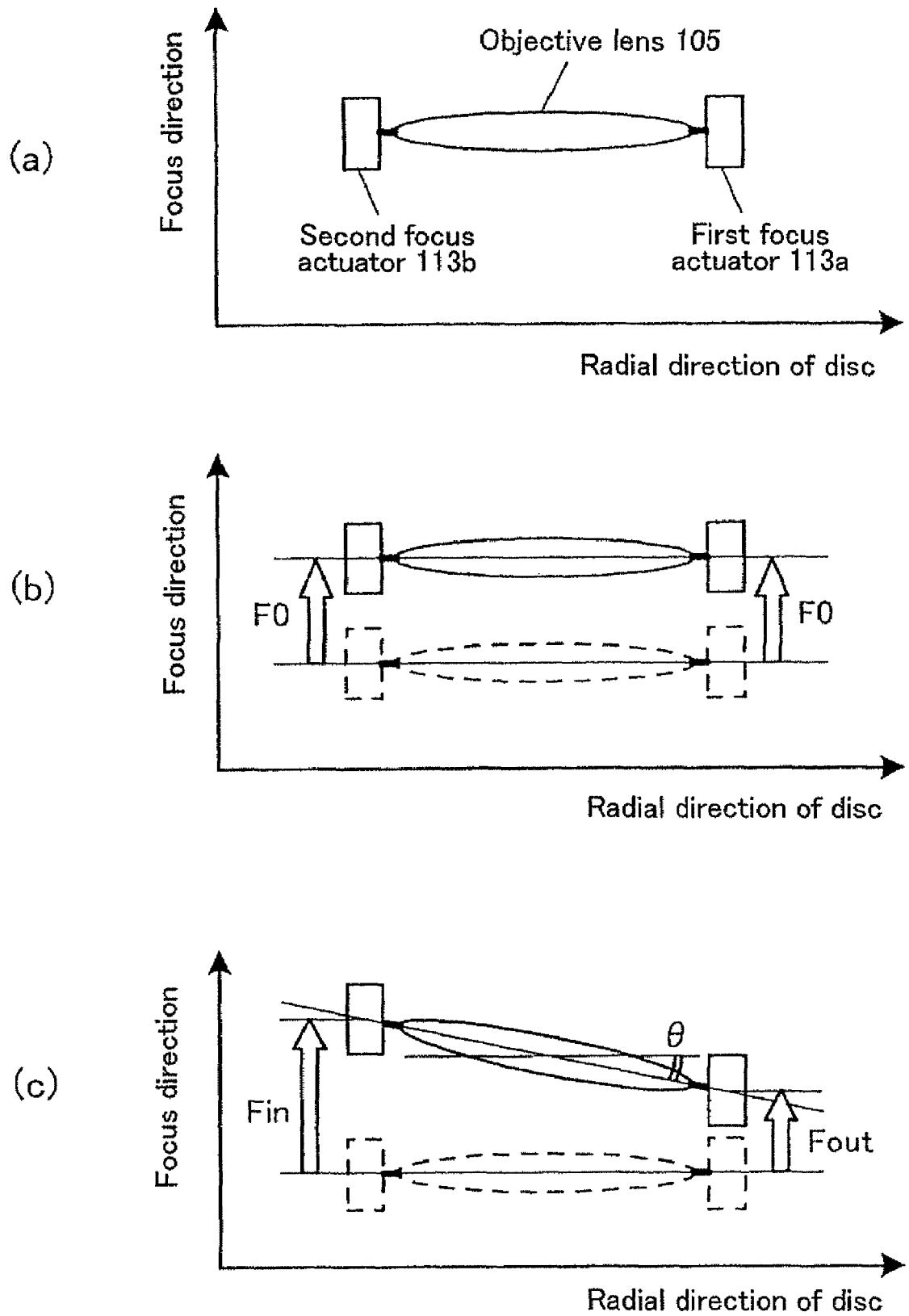
FIG. 3 is schematic chart showing a coma aberration correction operation performed with the objective lens 105 according to First Embodiment of the present invention.

As shown in Portion (a) of FIG. 3, the first focus actuator 113a and the second focus actuator 113b are mounted having the objective lens 105 interposed therebetween so as to be symmetrical to each other in the radial direction of the optical disc 106. The first focus actuator 113a is mounted on the outer circumference side of the objective lens 105, and the second focus actuator 113b is mounted on the inner circumference side of the objective lens 105.

In the case where an equal voltage is input to the first focus driving unit 112a and the second focus driving unit 112b, both ends of the objective lens 105 change the positions by the same amount, namely F0, in the focus direction (in the up and down direction in the figure), as shown in Portion (b) of FIG. 3.

On the other hand, in the case where there is a difference between a voltage input to the first focus driving unit 112a and a voltage input to the second focus driving unit 112b, the amounts of the changes, in the focus direction, in the positions of both ends of the objective lens 105 are Fin and Fout respectively, as shown in Portion (c) of FIG. 3. Thus, there is a difference between Fin and Fout. The difference in the amounts of the changes in the positions is in correspondence with the difference in the input voltages. As a result, the objective lens 105 tilts in the radial direction θ of the optical disc 106.

According to the present embodiment, it is possible to manipulate the tilt of the objective lens 105 (hereinafter referred to as a "lens tilt") with an arrangement wherein an output signal (hereinafter, referred to as a "lens tilt driving signal") from the microcomputer 116 is either added to or subtracted from, via the adder 114 and the subtracter 115, the signals input to the first focus driving unit 112a and the second focus driving unit 112b from the focus controlling unit 111.

When the optical axis of the objective lens 105 is tilted in the radial direction of the optical disc 106 with respect to the optical axis of a light beam, a coma aberration occurs in the radial direction. Also, when the optical disc 106 is tilted in the radial direction with respect to the optical axis of a light beam, a coma aberration occurs in the radial direction.

Accordingly, it is possible to offset the coma aberration occurring due to the tilt of the optical disc 106 in the radial direction, by making a difference between an input signal to the first focus driving unit 112a and an input signal to the second focus driving unit 112b by the lens tilt driving signal so as to make a lens tilt occur in the radial direction.

In this situation, because the relationship between the lens tilt driving signal value Vl and the lens tilt amount θl can be recognized in advance, the relationship is expressed as Kl so that Equation (4) shown below is obtained:

$$\theta l = Kl \times Vl \tag{4}$$

Also, on an assumption that it is possible to offset the coma aberration when the tilt id of the disc is equal to θl, Vl can be expressed as shown in Equation (5) below, based on Equations (3) and (4):

$$Vl = Kf/Kl \times Vf/R \tag{5}$$

In other words, when the optical disc 106 has a tilt in the radial direction, it is possible to reduce the coma aberration by determining the lens tilt driving signal value Vl based on the difference Vf between the focus driving signal values, which are obtained as a result of the detection of the tilt.

As additional information, generally speaking, in the case where the objective lens 105 is tilted with respect to the optical axis of a light beam, other types of aberrations also occur in addition to the coma aberration.

As optical discs have been developed to have high density, it is sometimes difficult to secure the recording and reproduction performance due to aberrations other than the coma aberration that occur due to a lens tilt. This is a problem of the coma aberration correction using a lens tilt.

For example, with regard to Blu-ray Discs, a high-density of an optical disc is achieved by using a purple-blue laser having a wavelength of 405 nm as the light source 101 and by setting the numerical aperture (NA) of the objective lens 105 to 0.85. In this case, when the objective lens 105 is realized with a single lens, the thickness of the lens inevitably becomes large in order to achieve the high numerical aperture of 0.85.

With such an optical system, when the objective lens 105 is tilted with respect to the optical axis of the light beam, not only a coma aberration, but also a spherical aberration occurs at the same time.

Further, it is not possible to perform the tilt detection described above all the time because of its characteristics. For this reason, in the case where there is a difference between the temperature of the optical disc 106 and the temperature inside the optical disc apparatus, when the optical disc 106 is inserted into the optical disc apparatus, what is called a thermal shock tilt, i.e. the degree of the tilt changes rapidly in a short period of time, occurs. Thus, a problem arises where an error in the tilt control becomes large. Consequently, these problems make it difficult to secure the performance of the optical disc apparatus.

Figure 4:
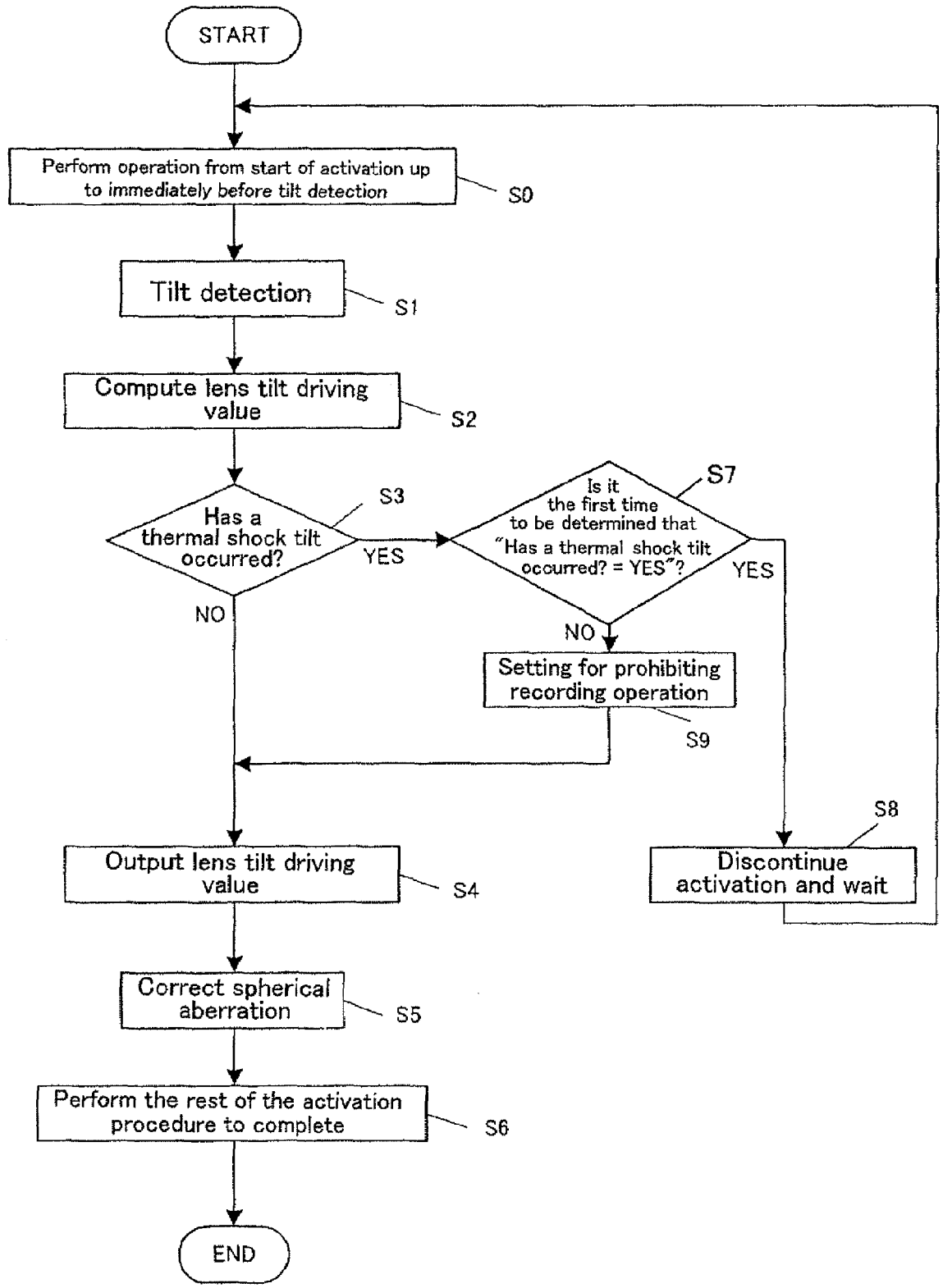
FIG. 4 is a flowchart showing an apparatus activation procedure that includes a coma aberration correction and a spherical aberration correction according to First Embodiment of the present invention.

In order to solve these problems, the tilt control operation according to the present embodiment is performed in accordance with the procedure described below during an activation of the optical disc apparatus. FIG. 4 is a flowchart for showing the sequence in the procedure to be performed during an activation of the apparatus. This flowchart will be described hereinafter.

Firstly, the operation from the start of the activation of the apparatus up to before the tilt detection is performed (S0). The tilt detection is performed at the inner circumference and the outer circumference using the focus driving values (S1). Then, the lens tilt driving value is computed from the detection result for the coma aberration correction (S2). Next, it is determined whether a thermal shock tilt has occurred or not (S3). In the case where it is determined that no thermal shock tilt has occurred, the microcomputer 116 outputs the lens tilt driving value (S4). Aberrations that have occurred due to the lens tilt are corrected (S5), and the sequence in the procedure is completed. After that, the activation of the apparatus is continued so as to be completed (S6).

In the case where it is determined that a thermal shock tilt has occurred in step S3, it is further determined whether it is the first time or not that the determined result shows that a thermal shock tilt has occurred (S7). In the case where it is the first time, the activation of the apparatus is discontinued, and a waiting period of a predetermined length is taken (S8). After the waiting period is finished, the procedure is started all over again from step S0. In the case where it is determined in step S7 that it is the second time, the apparatus is set to a mode where the recording operation is prohibited thereafter (S9). After that, the procedure in steps S4 through S6 is executed.

Hereinafter, each of the steps in the procedure will be described in detail. The present embodiment assumes a system in which a spherical aberration occurs due to a lens tilt.

Firstly, step S1 will be described with reference to FIG. 5.

Figure 5:
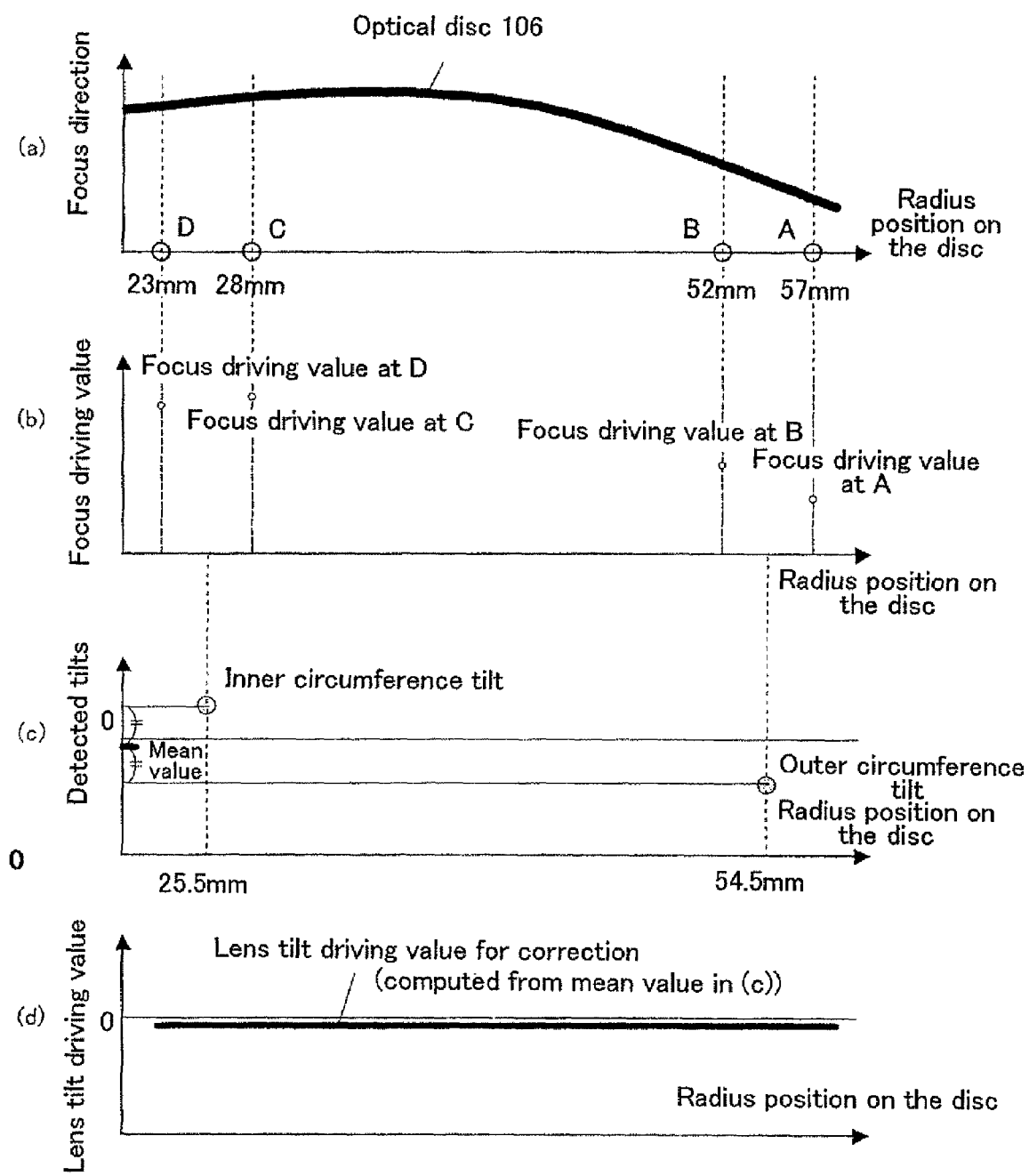
FIG. 5 is schematic chart for explaining the procedure starting with the tilt detection operation when the apparatus is activated and up to calculation of a lens tilt driving value to correct a coma aberration, according to First Embodiment of the present invention.

Portion (a) of FIG. 5 is a schematic chart showing the shape of a disc targeted for the tilt detection and the settings of the detection radius positions for the focus driving values used in the detection. The microcomputer 116 has the optical head moving unit move the optical head 100 sequentially to each of the detection radius positions A to D by an optical head moving means, detects a focus driving value at each of the detection radius positions and stores each focus driving value into the memory 117. The results of the focus driving value detection are shown in Portion (b) of FIG. 5. Based on the results of the focus driving value detection that are stored in the memory 117, the microcomputer 116 computes the tilts at a substantially innermost circumference and at a substantially outermost circumference, using Equation (3) and stores the computed tilts into the memory 117. The results of the tilt detection are shown in Portion (c) of FIG. 5.

Next, step S2 will be described with reference to Portion (d) of FIG. 5.

Based on the results of the tilt detection in step S1, the microcomputer 116 computes a mean value of the tilt at the substantially innermost circumference and the tilt at the substantially outermost circumference. Further, based on the computed mean value of the tilts and Equation (5), the microcomputer 116 computes a lens tilt driving value.

Next, step S3 will be described.

Figure 6:
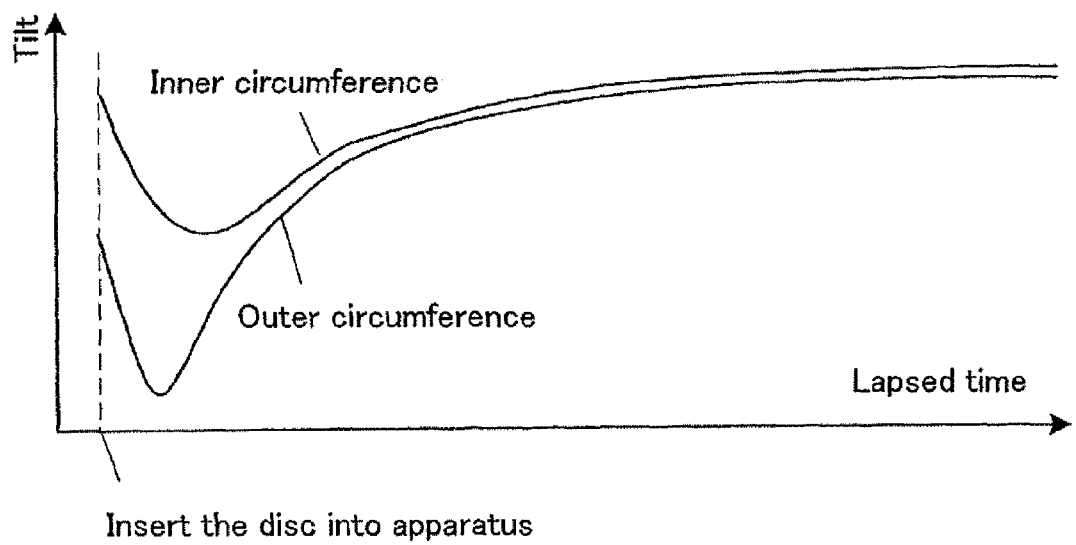
FIG. 6 is a characteristic chart showing a time characteristic of a thermal shock tilt according to First Embodiment of the present invention.
Figure 7:
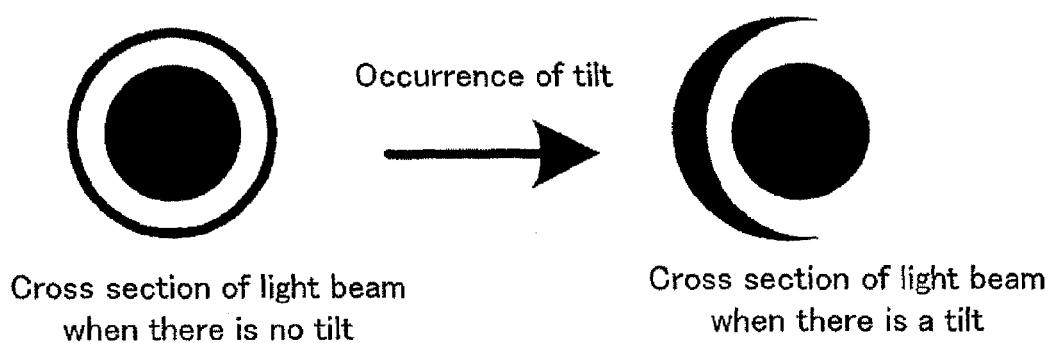
FIG. 7 is a schematic view showing, in order to explain a conventional technique, how the distribution of the strength of a light beam on an optical disc changes when a tilt occurs.
Figure 9:
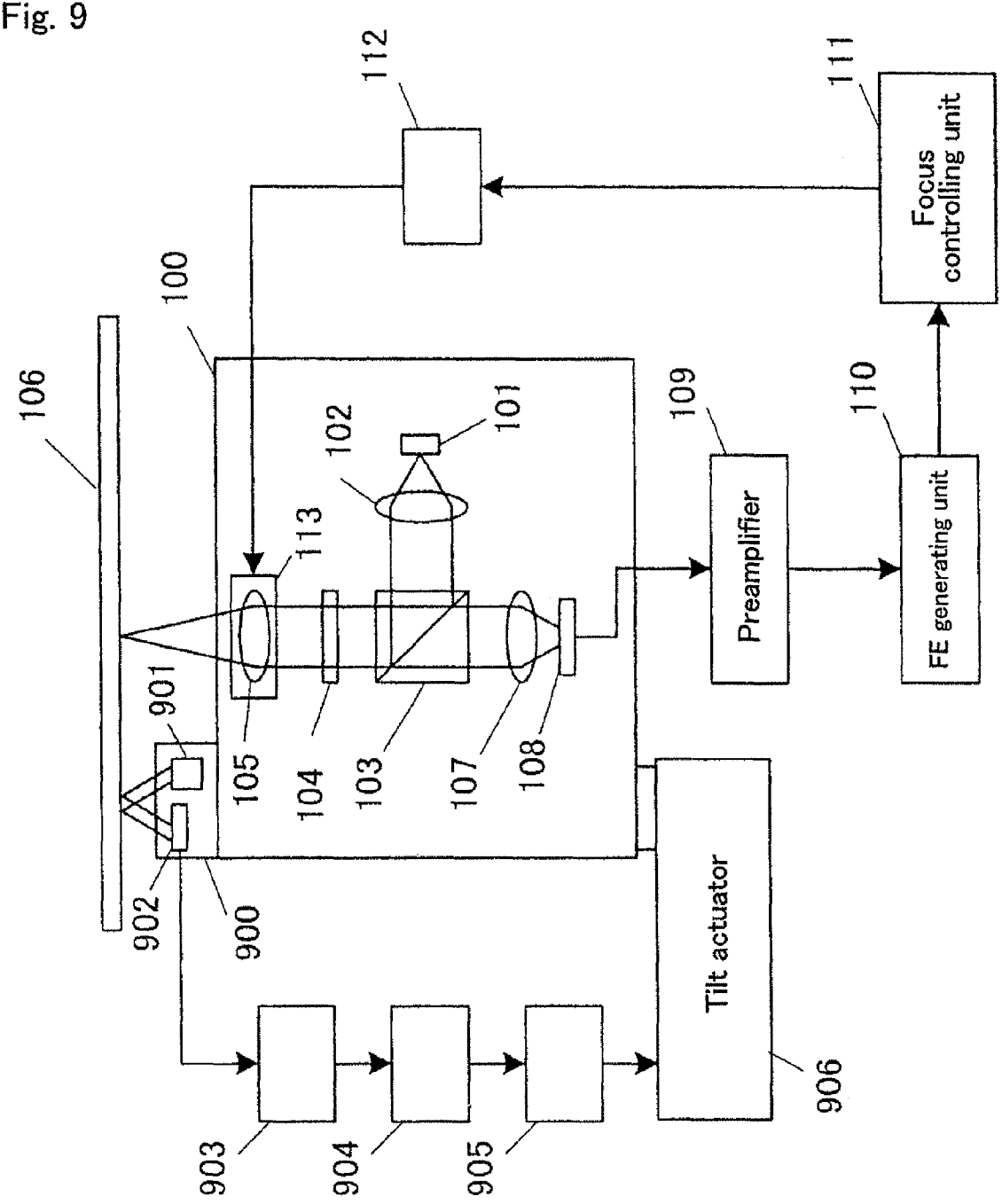
FIG. 9 is a block diagram showing an optical disc apparatus according to a conventional technique.

A thermal shock tilt has a time characteristic, as shown in FIG. 6. It can be observed that the change in the tilt at the outer circumference becomes extremely large. In the case where one of the following determination is satisfied, it is determined that a thermal shock tilt has occurred: <Determination 1> The absolute value of the tilt at the substantially outermost circumference detected in step S1 is larger than a predetermined value; and <Determination 2> The absolute value of the lens tilt driving value computed in step S2 is larger than a predetermined value.

Next, step S5 will be described.

The microcomputer 116 moves the optical head by the optical head moving means to a test zone. In the case where no signals are recorded in the test zone, recording will be performed. A signal is output from the microcomputer 116 to the collimator lens moving motor driving unit 118. The signal amplified by the collimator lens moving motor driving unit 118 drives the collimator lens moving motor 119 and changes the position of the collimator lens 102. When the distance between the collimator lens 102 and the light source 101 changes, the light to be emitted from the collimator lens 102 changes from a collimated light into a divergent light and a convergent light. Therefore, the spherical aberration, on the data surface, of the light beam converged on the optical disc 106 from the objective lens 105 changes. Accordingly, it is possible to adjust the spherical aberration so that the reproduction jitter is optimized by having the position of the collimator lens 102 changed by the microcomputer 116, reproducing the recorded signal and detecting the jitter in the reproduction signal (not shown in the figure).

Lastly, steps S7 to S9 will be described.

In order to avoid having a thermal shock tilt, it is necessary to wait until the temperature of the optical disc 106 becomes closer to the temperature inside the optical disc apparatus. For this reason, in the case where it is determined that a thermal shock tilt has occurred, the re-activation of the apparatus is performed after the waiting period of a predetermined length so that the temperature inside of the optical disc 106 becomes closer to the temperature inside the optical disc apparatus. Further, in the case where it is determined that a thermal shock tilt has occurred even in the re-activation after the waiting period, it is considered that it is not a thermal shock tilt, but the disc has an extremely large disc tilt. It is possible to perform the coma aberration correction using a lens tilt on a disc having a large tilt; however, in such a situation, a problem described below will arise.

In other words, an aberration that occurs due to a lens tilt generally increases with respect to the lens tilt with the characteristic of a quadratic function or a function of a higher order. For this reason, even if the spherical aberration is corrected like in the example according to the present embodiment, other types of aberrations occur, and the state of the light spot is optically degraded. When an attempt is made to perform a proper recording under such a condition, the degradation due to the aberrations needs to be compensated by an increase in the recording power; however, there is a limit to how much light emission power of the semiconductor laser serving as the light source can be increased. Consequently, in order to protect the light source, it is necessary to have an arrangement in which the optical disc apparatus does not perform the recording operation if the lens tilt has an angle equal to or larger than a predetermined value.

By having this arrangement, it is possible to always keep the tilt margin for the optical disc apparatus large and also to correct the spherical aberration that occurs due to the coma aberration correction.

Accordingly, it is possible to achieve a light spot that is always optically good for the whole circumference of the optical disc. Thus, the reliability of the recording and reproduction operations by the optical disc apparatus is improved.

Also, the arrangement is made in which the lens tilt for the coma aberration correction does not change according to the radius positions. Thus, when a search operation during which the position of the optical head 100 largely changes is performed, there is no need to correct spherical aberrations in correspondence with the changes in the lens tilt, which shortens the period of time required for executing the search operation, thereby resulting in improving the performance of the optical disc apparatus.

Also, because the tilt detection is performed only at the substantially innermost circumference and at the substantially outermost circumference, which shortens the period of time required for the tilt detections i.e., shortens the period of time required for the activation of the optical disc apparatus, thereby improving the performance of the optical disc apparatus.

Further, the arrangement is made in which it is determined whether a thermal shock tilt has occurred during the activation of the optical disc apparatus and, when it is determined that a thermal shock tilt has occurred, the procedure waits until the thermal shock tilt has settled. Thus, it is possible to perform the activation while the influence of the thermal shock tilt is avoided, thereby improving the reliability of the recording and reproduction by the optical disc apparatus.

Furthermore, the arrangement is made in which the recording operation is prohibited after the apparatus is activated, in the case where a disc tilt or a lens tilt for the coma aberration correction is still large even if the influence of a thermal shock tilt is avoided. Thus, it is possible to protect the light source, thereby improving the performance of the optical disc apparatus.

In the description above, the procedure of the operation to be performed during the activation of the optical disc apparatus is used as an example; however, the scope of the present invention is not limited by the timing at which the sequence in the procedure is executed. It is possible to achieve the same effect to solve the problems by performing the aforementioned sequence in the procedure with an arrangement in which, for example, a tilt detection is performed again after the apparatus is activated so as to follow the change in the tilt over the course of time, and the lens tilt is changed according to the result of the tilt detection.

Also, in the example above, the lens tilt driving value is obtained based on the mean value of the tilts detected at the substantially innermost circumference and at the substantially outermost circumference; however, it is possible to have an arrangement wherein the lens tilt driving value is obtained based on a mean value of the largest value and the smallest value of the tilt across the radial direction. The reason for this is because an optical disc is in the shape of a flat disc and, generally, the shape in a cross section in the radial direction is so-called the shape of a bowl being either warped or drooped. In such a case, the tilt increases or decreases monotonically, and the tilts at the innermost circumference and at the outermost circumference are equal to the smallest value and the largest value (or the largest value and the smallest value) of the tilt in the radial direction.

In this situation, because the tilt margin of the optical disc apparatus becomes the largest, the reliability of the recording and reproduction operations by the optical disc apparatus is improved.

Further, according to the present embodiment, the correction of the spherical aberration in step S5 in FIG. 4 is performed using the method based on the relationship between the change in the position of the collimator lens 102 and the change in the jitter for the reproduction of the signal in the test zone; however, the present invention is not limited to the use of this method.

Second Embodiment

Figure 10:
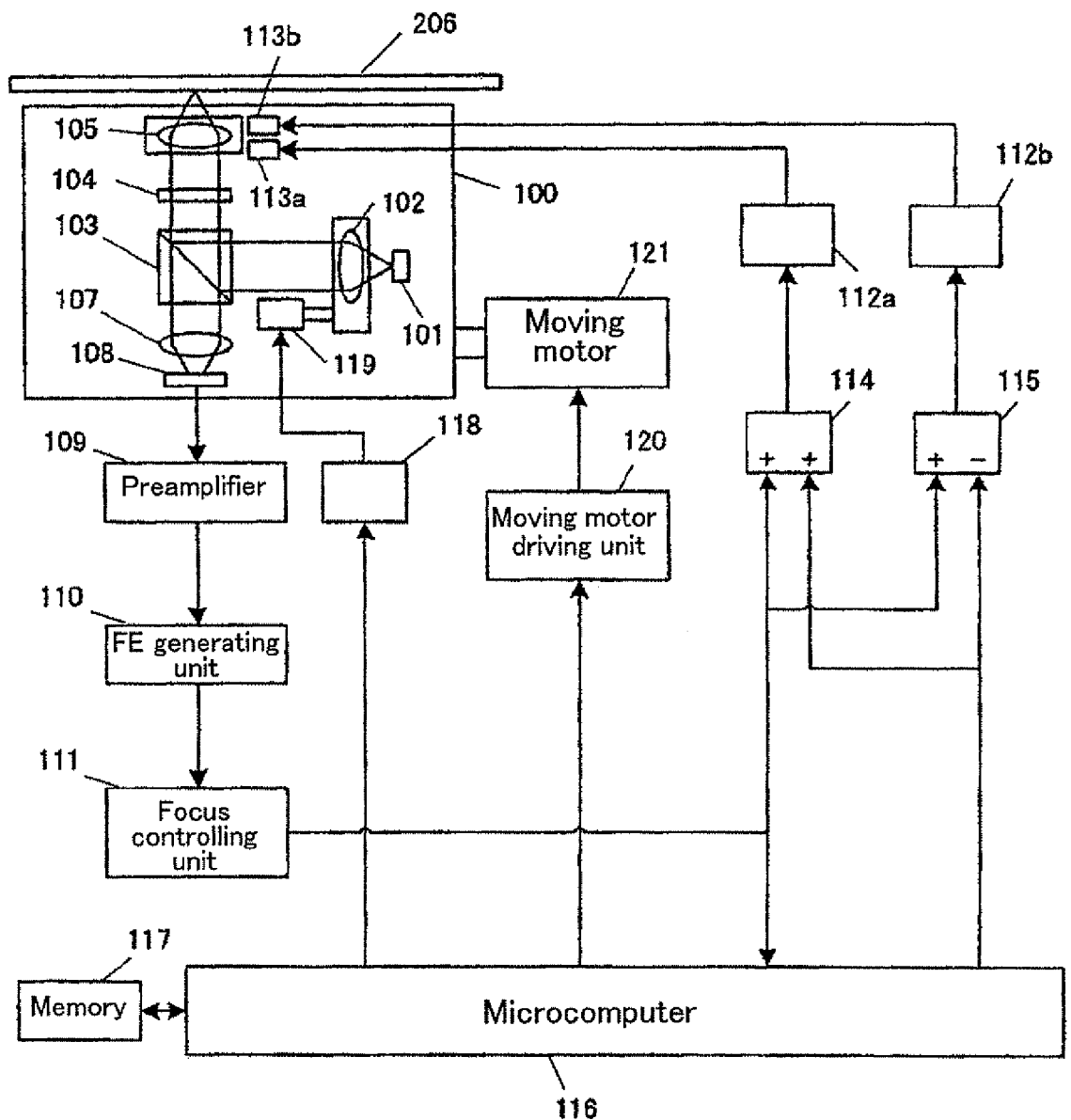
FIG. 10 is a block diagram showing an optical disc apparatus according to Second Embodiment of the present invention.

FIG. 10 is a block diagram showing a structure of an optical disc apparatus according to Second Embodiment of the present invention. It should be noted that the constituent elements that are also included in the optical disc apparatuses according to First Embodiment and the conventional technique are referred to by using the same reference numbers, and therefore the description thereof will be omitted.

An optical disc 206 is an optical disc (a multi-layer optical disc) that has a plurality of data layers (i.e. two or more data layers). Herein, the optical disc 206 is a dual layer optical disc having two data layers. The optical disc apparatus shown in FIG. 10 is capable of performing recording and reproduction operations on a dual layer optical disc.

Like in First Embodiment, the optical disc apparatus according to the present embodiment performs the coma aberration correction using the objective lens 105. Thus, it is possible to improve the reliability of the performance of the recording and reproduction operations on dual layer optical discs.

The degree of a coma aberration caused by a tilt is generally in proportion to the thickness of the base material. Thus, in a multi-layer optical disc, a coma aberration that occurs in each data layer due to a disc tilt such as a warp or a droop of the disc is different from each data layer.

As optical discs have been developed to have high density, it is sometimes difficult to secure the performance in the recording and reproduction due to the difference between the coma aberrations occurring in the different data layers. This is a problem of the coma aberration correction using a lens tilt.

Figure 11:
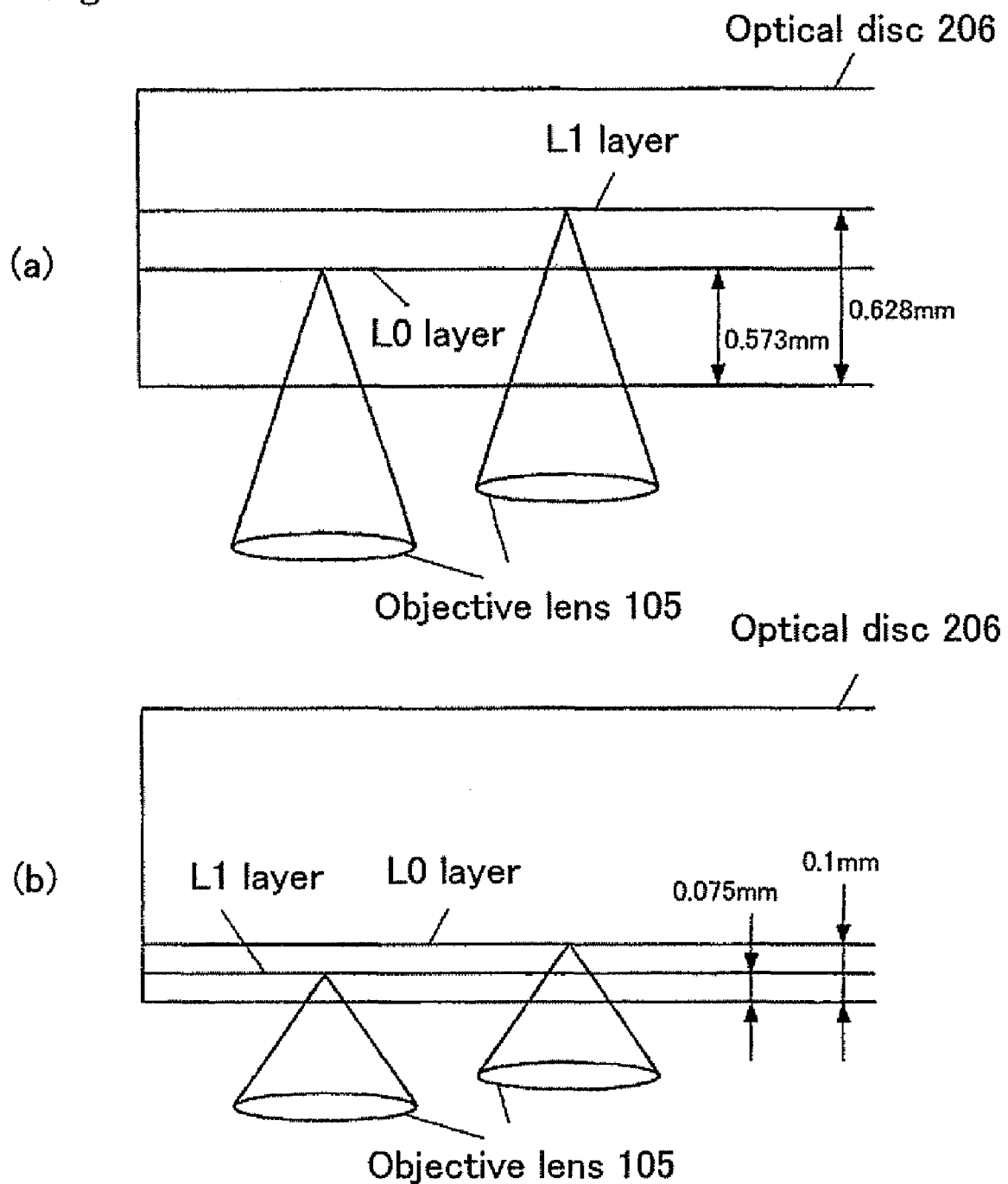
FIG. 11 is schematic chart showing the thickness of a base material in a dual layer DVD-ROM disc and the thickness of a base material in a dual layer Blu-ray disc, according to Second Embodiment of the present invention.

For example, in a dual layer DVD-ROM disc, as shown in Portion (a) of FIG. 11, the thickness of the base material in each of the layers is 0.573 mm for the L0 layer and 0.628 mm for the L1 layer. As noted above, because the degree of a coma aberration that occurs due to a tilt is in proportion to the thickness of the base material, the ratio of the coma aberration occurring in the L1 layer to the coma aberration occurring in the L0 layer is 0.628/0.573.

For example, with a dual layer DVD-ROM, when a coma aberration correction is performed for the L0 layer, and if the coma aberration is performed for the L1 layer under the same condition, the error in the coma aberration corrections between these layers is approximately 10%.

On the other hand, in a dual layer Blu-ray disc which has a higher density than a DVD-ROM disc, as shown in Portion (b) of FIG. 11, the thickness of the base material in each of the layers is 0.1 mm for the L0 layer and 0.075 mm for the L1 layer. The ratio of the coma aberration occurring in the L1 layer to the coma aberration occurring in the L0 layer is 0.075/0.1.

As a result, the error in the coma aberration corrections between these layers is approximately 30%. In the recording and reproduction operations on an optical disc having high density, the amount of the error like this is too large to ignore.

In order to solve this problem, according to the present embodiment, a lens tilt driving amount is determined for each of the two layers, namely, the L0 layer and the L1 layer, as described below.

Like in First Embodiment, on an assumption that it is possible to offset the coma aberration when the tilt id detected in the L0 layer is equal to the lens tilt amount $\theta L0$, it is possible to express $\theta L0$ using Equation (6) shown below:

$$VL0 = \theta/K1 \qquad (6)$$

Like in First Embodiment, because the relationship between the lens tilt driving signal value VL0 and the lens tilt amount $\theta L0$ can be recognized in advance, the relationship is denoted as K1 so that VL0 can be expressed using Equation (7) shown below:

$$VL0 = \theta d/K1 \qquad (7)$$

As described before, the coma aberration occurring due to a tilt $\theta d$ is in proportion to the thickness of the base material, and the thickness of each of the base materials in the disc is a known value that is determined according to a standard. Accordingly, when the thickness of the base material in the L0 layer and the thickness of the base material in the L1 layer are denoted as tL0 and tL1, respectively, the lens tilt amount $\theta L1$ to offset the coma aberration occurring in the L1 layer due to the tilt $\theta d$ can be expressed using Equation (8) shown below:

$$\theta L1 = \theta L0 \times tL1/tL0 \qquad (8)$$

Accordingly, a lens tilt driving signal VL1 for the L1 layer can be expressed using Equation (9) shown below:

$$VL1 = \theta d \times tL1/tL0/K1 \qquad (9)$$

In other words, when the optical disc 206 has a tilt in the radial direction, by determining the lens tilt driving signals VL0 and VL1, based on the result of the tilt detection $\theta d$ and the ratio of the thickness of the base materials tL1/tL0, it is possible to reduce the coma aberrations in each of the layers, namely, the L0 layer and the L1 layer.

In other words, by arranging the lens tilt driving signals, which are the output signals from the microcomputer 116, to be VL0 for the L0 layer and to be LV1 for the L1 layer, it is possible to perform an optimized coma aberration correction operation for each of the layers.

With the arrangement described above, it is possible to achieve a light spot that is always optically good for each of the layers in the multi-layer optical disc apparatus. Thus, it is possible to improve the reliability of the recording and reproduction operations by the optical disc apparatus.

In the present embodiment, an example is used in which the optical disc has two data layers, namely, the L0 layer and the L1 layer; however, the scope of the present invention is not limited by the number of the layers. In other words even in the case where an optical disc has three or more layers, it is possible to achieve the same effect to solve the problem by determining the lens tilt driving signal for each of the layers based on the lens tilt driving signal VL0 for the L0 layer, and the ratio of the thickness of the base materials among the L0 layer and the other layers and performing the coma aberration correction operation.

Further, in the present embodiment, the lens tilt driving signal VL0 for the L0 layer, is used as a reference so that the lens tilt driving signal for each of the layers is determined based on the ratio of the thickness of the base material of the other layer with respect to the L0 layer; however, the scope of the present invention is not limited by the determining method using this reference. It is possible to achieve the same effect to solve the problem by using a lens tilt driving signal for at least one of the plurality of data layers as a reference and determining the lens tilt driving signal for each of the layers based on the ratio of the thickness of the base materials among the one of the layers and the other layers and then performing the coma aberration correction operation.

Further, in the present embodiment, the ratio of the thickness of the base materials is computed on an assumption that the thickness of the base material for each of the layers is a known value, and the lens tilt driving signal for each of the layers is determined based on the computed ratio of the thickness of the base materials; however, the scope of the present invention is not limited by the method of calculating the ratio of the thickness of the base materials. For example, it is acceptable to have an arrangement wherein, in the case where the optical disc apparatus includes a base material thickness detecting unit that detects the thickness of the base material for each of the layers, the thickness of the base materials is computed according to the result of the detection. Also in this case, it is possible to achieve the same effect to solve the problem by determining the lens tilt driving signal for each of the layers using the computed thickness of the base materials and performing the coma aberration correction operation.

INDUSTRIAL APPLICABILITY

The optical disc apparatus according to the present invention has a radial tilt margin that is always large, for an optical disc having a radial tilt. The optical disc apparatus also has an effect of correcting other types of aberrations. Thus, the optical disc apparatus is useful in improving the reliability of apparatuses for recording and reproducing optical discs.

Further, the optical disc apparatus according to the present invention has an effect of shortening the adjustment period during the activation of the apparatus. Thus, the optical disc apparatus is useful in improving the performance of apparatuses that perform the reproduction and recording operations on optical discs.

The invention claimed is:

1. An optical disc apparatus comprising:
   an optical head for irradiating a light beam onto an optical disc;
   an optical head moving means for moving the optical head in a radial direction of the optical disc;
   a coma aberration correcting means for correcting a coma aberration of the light beam in the radial direction on the optical disc; and
   a tilt detecting means for detecting a tilt of the optical disc in the radial direction,
   wherein an amount of the correction performed by the coma aberration correcting means is a predetermined value regardless of a position of the optical head, and
   the optical head is moved by the optical head moving means in a predetermined moving range,
   the predetermined value is determined based on the mean value of the tilt detected by the tilt detection means at a substantially innermost circumference position on the optical disc and the tilt detected by the tilt detection means at a substantially outermost circumference position on the optical disc; and
   wherein the tilt detection means detects the tilt at the substantially innermost circumference position by calculating a mean value of focus driving values detected at two locations on the optical disc, said two locations being equidistant from and on opposite sides of the substantially innermost circumference position along the radial direction
   the tilt detection means detects the tilt at the substantially outermost circumference position by calculating a mean value of focus driving values detected at two other locations on the optical disc, said two other locations being equidistant from and on opposite sides of the substantially outermost circumference position along the radial direction; and
   the predetermined moving range is a range between an innermost of two said locations and an outermost of said two other locations along the radial direction.

2. An optical disc apparatus according to claim 1, wherein the optical disc includes a plurality of data layers, and the amount of the correction performed by the coma aberration correcting means is a predetermined value for each of the data layers, regardless of the position of the optical head.

3. An optical disc apparatus according to claim 1, further comprising:
   an aberration correcting means for correcting an aberration, other than the coma aberration, of the light beam in the radial direction on the optical disc, wherein
   after the coma aberration is corrected by the coma aberration correcting means, the aberration other than the coma aberration is corrected by the aberration correcting means.

4. An optical disc apparatus according to claim 3, wherein the aberration correcting means includes a spherical aberration correcting means for correcting a spherical aberration.

5. An optical disc apparatus according to claim 1, wherein the optical disc apparatus is activated, in a case where the tilt of the optical disc detected by the tilt detecting means exceeds a predetermined angle, the activation of the optical disc apparatus is started all over again.

6. An optical disc apparatus according to claim 5, wherein the activation of the optical disc apparatus is started all over again based on the tilt of the optical disc detected by the tilt detecting means at an outer circumference position on the optical disc.

7. An optical disc apparatus according to claim 5, further comprising: a correction amount determining means for determining the amount of the correction performed by the coma aberration correcting means based on the tilt of the optical disc detected by the tilt detecting means, wherein the optical disc apparatus is activated, in a case where the amount of the correction determined by the correction amount determining means exceeds a predetermined value, the activation of the optical disc apparatus is started all over again.

8. An optical disc apparatus according to claim 7, wherein during the activation of the optical disc apparatus that has been started all over again, in a case where the amount of the correction determined by the correction amount determining means exceeds a predetermined value once again, the recording operation by the optical disc apparatus is prohibited.

9. An optical disc apparatus according to claim 5, wherein during an activation of the optical disc apparatus that has been started all over again, in a case where the tilt of the optical disc detected by the tilt detecting means exceeds a predetermined angle once again, a recording operation by the optical disc apparatus is prohibited.

* * * * *